(12) United States Patent
Tahara et al.

(10) Patent No.: US 6,499,848 B2
(45) Date of Patent: Dec. 31, 2002

(54) SLIDE FEEDER, SLIDE SYSTEM AND SLIDE FEEDING METHOD

(75) Inventors: Yoshihiro Tahara, Kanagawa (JP); Kiyotaka Dochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/775,326

(22) Filed: Feb. 1, 2001

(65) Prior Publication Data

US 2001/0010577 A1 Aug. 2, 2001

(30) Foreign Application Priority Data

Feb. 2, 2000 (JP) ........................ 2000-030278

(51) Int. Cl.$^7$ ................... G03B 23/02; G03B 23/00
(52) U.S. Cl. .............. 353/113; 353/103; 353/118
(58) Field of Search ................ 353/103, 108, 353/109, 112, 113, 118, 114

(56) References Cited

U.S. PATENT DOCUMENTS

| | | | | |
|---|---|---|---|---|
| 3,194,549 A | * | 7/1965 | Wirtz | 271/150 |
| 3,904,287 A | * | 9/1975 | Matsumura | 353/114 |
| 4,331,398 A | | 5/1982 | Kawarada et al. | |
| 4,368,964 A | | 1/1983 | Carlson | |
| 5,233,376 A | * | 8/1993 | Maron | 353/103 |
| 5,589,953 A | | 12/1996 | Tazawa et al. | |

FOREIGN PATENT DOCUMENTS

| | | |
|---|---|---|
| GB | 0727521 | 4/1955 |
| GB | 0986233 | 3/1965 |
| GB | 1175862 | 1/1970 |
| GB | 1193528 | 6/1970 |
| GB | 1206532 | 9/1970 |
| GB | 2 231 971 A | 11/1990 |

OTHER PUBLICATIONS

Copy of International Search Report.

* cited by examiner

Primary Examiner—Russell Adams
Assistant Examiner—Andrew Sever
(74) Attorney, Agent, or Firm—Crosby, Heafey, Roach & May

(57) ABSTRACT

A slide feeder, a slide system and a slide feeding method are disclosed. Conventional slide feeders are incapable of feeding the same slide mounts repeatedly to an external appliance with no help by a human hand, accordingly are unsuited to a scanning work at a high speed and incapable of separating slides stably at a feeding time. To overcome these problems, the present invention comprises feeding slide mounts stocked in a first slide stock section to an external appliance and stocking slide mounts discharged from the external appliance into a second slide stock section in a first operation mode, and feeding and stocking the slide mounts reversely in a second operation mode. Furthermore, the slide mounts are carried in a feeding direction with a rotating force of a roller. Moreover, the slide mounts are separated with a separating pad at a feeding time.

17 Claims, 9 Drawing Sheets

SLIDE FEEDER, SLIDE SYSTEM AND SLIDE FEEDING METHOD

BACKGROUND OF THE INVENTION

1. Field of the Invention

The present invention relates to a slide feeder, a slide system and a slide feeding method, and more particularly, is suitably applicable, for example, to a slide feeder which feeds slides to a slide scanner.

2. Description of the Related Art

A slide mount (hereinafter simply referred to as a slide) 1 is conventionally configured by holding a developed photographic film 2 corresponding to a frame with a frame like case 3 made of synthetic resin, paper or the like as shown in FIG. 1.

There have conventionally been used an apparatus which converts an image on the slide 1 (that is, an image recorded on the photographic film 2) into an electric signal by optically scanning the image (hereinafter referred to as a film scanner) and an apparatus which is configured to be capable of consecutively feeding the slide 1 one by one to the film scanner (hereinafter referred to as a slide feeder).

Such a conventional slide feeder has a configuration in which structures are different between a first slide stock section for stocking the slide 1 which has not yet been fed to a slide scanner and a second slide stock section for stocking the slide 1 discharged from the slide scanner, thereby being incapable of automatically feeding the slide 1 stocked in the second slide stock section again into the slide scanner.

When such a conventional slide feeder is to carry out works of preliminary scanning a plurality of slides 1 with the slide scanner, selecting a slide for a color adjustment or the like and then regularly scanning the slides 1 once again with the slide scanner, for example, the conventional slide feeder therefore requires a manual work to return the slides 1 stocked in the second slide stock section to the first slide stock section thereby posing a problem of inconvenience in use.

Furthermore, the conventional slide feeder uses a molded feeding block 4 which is disposed in the above described first slide stock section so as to be movable in a feeding direction (indicated by an arrow g) of the slides 1 and a reverse direction as shown in FIG. 2, and sends out the slides 1 to the slide scanner by pushing the slides 1 with the feeding block 4 in the feeding direction on the basis of a driving force given from a driving system (not shown) to the feeding block 4.

Accordingly, such a slide feeder is incapable of feeding a next slide 1 until the feeding block 4 returns to an original position after feeding the slide 1 and is not suited to a high-speed scanning work, thereby being still insufficient or problematic in performance.

Furthermore, the conventional slide feeder separates the slides 1 using a metal leaf spring 5 as shown in FIG. 2 to prevent the slides 1 from being fed in a plurality to the slide scanner, but the leaf spring 5 cannot stably separate the slides 1 framed with the thin paper cases 3 (FIG. 1), thereby being still insufficient or problematic in stable feeding capability for the slides 1.

SUMMARY OF THE INVENTION

In view of the foregoing, an object of this invention is to provide a slide feeder, a slide system and a slide feeding method which are capable of first enhancing convenience in use and secondly remarkably improving performance.

The foregoing object and other objects of the invention have been achieved by the provision of a slide feeder which comprises: a slide carrying mechanism section which is disposed between a first and second slide stock sections, and feeds the slide mounts stocked in the first slide stock section into an external appliance, and takes and carries the slide mounts discharged from the external appliance so as to be stocked into the second slide stock section in a first operation mode, and feeds the slide mounts stocked in the second slide stock section into the external appliance and carries the slide mounts discharged from the external appliance so as to be stocked into the first slide stock section in a second operation mode.

As a result, this slide feeder is capable of feeding the same slide mounts repeatedly into the external appliance simply by switching the operation modes with no help by a human hand.

Furthermore, the slide feeder according to the present invention uses a rotatable roller and roller driving means for rotatingly driving the above described roller which are disposed in the slide carrying mechanism section for carrying the slide mounts so that the slide mounts stocked in the first slide stock section are pressed to the roller, thereby being carried in a feeding direction with a rotating force of the above described roller.

As a result, this slide feeder is capable of sending out a next slide mount immediately after sending out a slide mount. Accordingly, the slide feeder is sufficiently capable of coping with a high-speed treatment of slide mounts in practical use, for example, with an external appliance.

Furthermore, the slide feeder according to the present invention uses a separating pad having a taper surface which is disposed in the slide carrying mechanism section for carrying the slide mount and strikes leading ends of the slide mounts in the feeding direction against the taper surface of the separating pad, thereby separating the slide mounts at a feeding time.

As a result, the slide feeder is capable of performing separation of the slide mount at the feeding time more securely than that performed using, for example, an elastic member such as a leaf spring.

Furthermore, according to the present invention, a slide system is composed between the slide feeder for carrying slide mounts and an external appliance to which the slide mounts are fed.

As a result, this slide system is capable of feeding the same slide mounts repeatedly into the external appliance simply by switching the operation modes with no help by a human hand.

Furthermore, the slide feeding method according to the present invention comprises: in a first operation mode, feeding slide mounts stocked in the first slide stock section which is disposed in a slide feeder from the slide feeder to the external appliance, and taking and carrying the slide mounts discharged from the external appliance so as to stock the slide mounts into the second slide stock section disposed in the slide feeder; and in a second operation mode, feeding the slide mounts stocked in the second slide stock section to the external appliance, taking the slide mounts discharged from the external appliance and carrying the slide mounts so as to stock into the first slide stock section.

In this way, this slide feeding method is capable of feeding the same slide mounts repeatedly into the external appliance simply by switching the operation modes with no help by a human hand.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
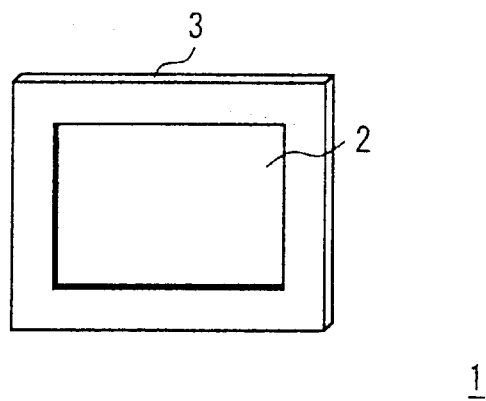
FIG. 1 is a schematic perspective view showing a configuration of a slide.
Figure 2:
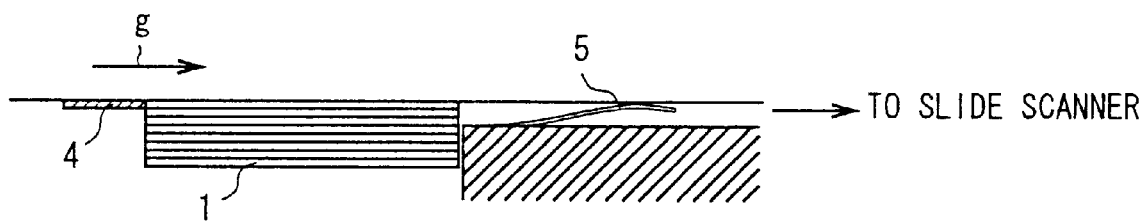
FIG. 2 is a schematic diagram descriptive of a conventional slide feeder.

Preferred embodiments of this invention will be described with reference to the accompanying drawings:

In FIGS. 3 to 6, reference numeral 10 denotes a slide feeder as a whole according to the present invention which is disposed adjacent to a slide scanner 11 and configured to be capable of consecutively feeding slides 1 successively to the above described slide scanner 11.

Figure 7:
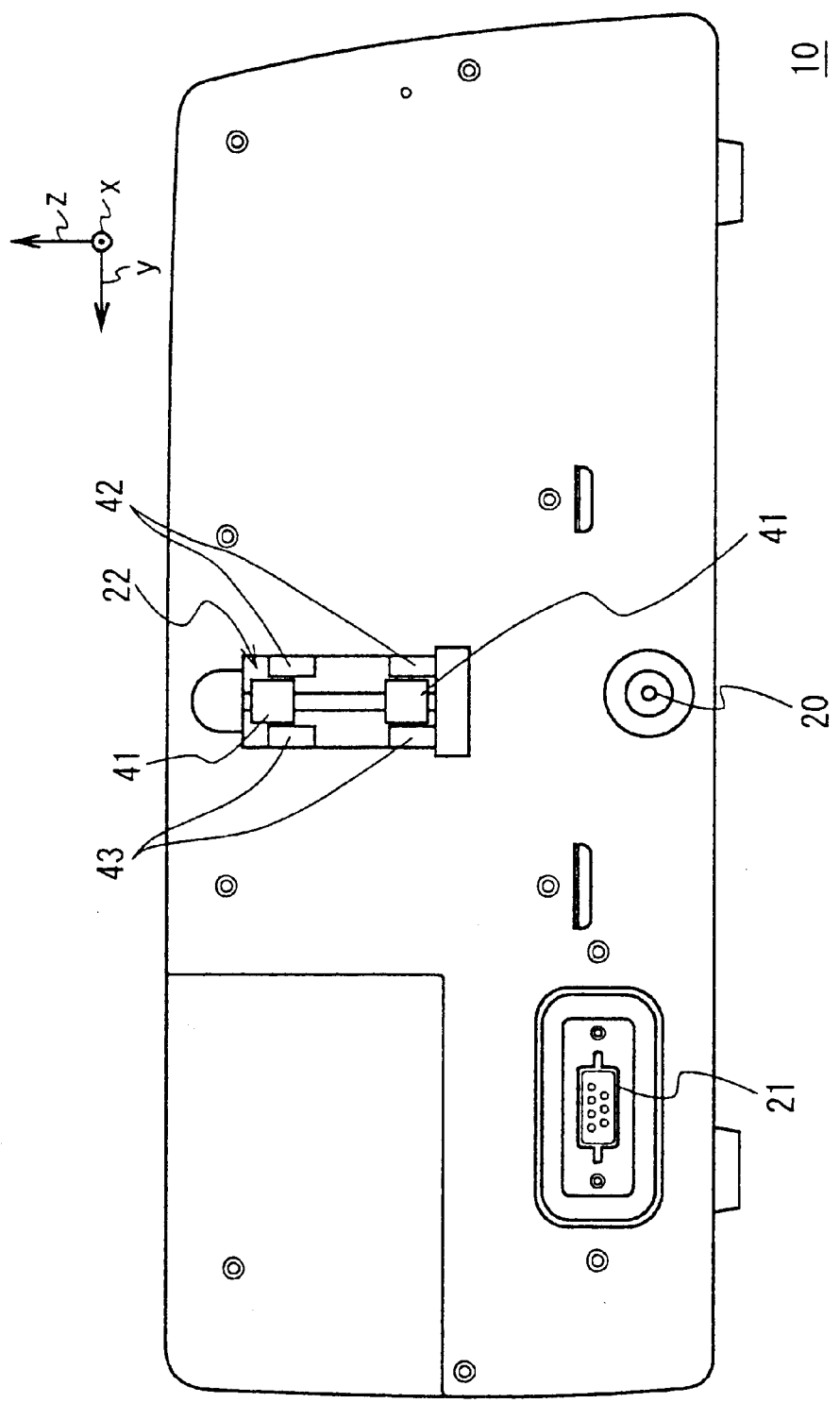
FIG. 7 is a rear view showing the configuration of the slide feeder according to the present embodiment.

That is, the slide feeder 10 has a fixing screw 20 which is disposed at a center in a direction indicated by an arrow y so as to run through the above described slide feeder 10 and a connector 21 which is disposed on a rear surface as shown in FIG. 7 for electrical connection to the slide scanner 11.

Thereby, the slide feeder 10 is configured to be physically and electrically connectable to the slide scanner 11 by connecting the connector 21 to a connector (not shown) on a side of the slide scanner 11 and then screwing a tip of the fixing screw 20 into a corresponding tapped hole (not shown) of the slide scanner 11.

Furthermore, a slide supply/discharge port 22 is disposed on the rear surface of the slide feeder 10 at a center in a direction indicated by an arrow y so as to correspond to a slide supply/discharge port (not shown) of the slide scanner 11 as apparent from FIG. 7, whereby the slide feeder 10 is configured to be capable of feeding the slides 1 into the slide scanner 11 through the above described slide supply/discharge port 22 or taking the slides 1 discharged from the slide scanner 11.

Figure 3:
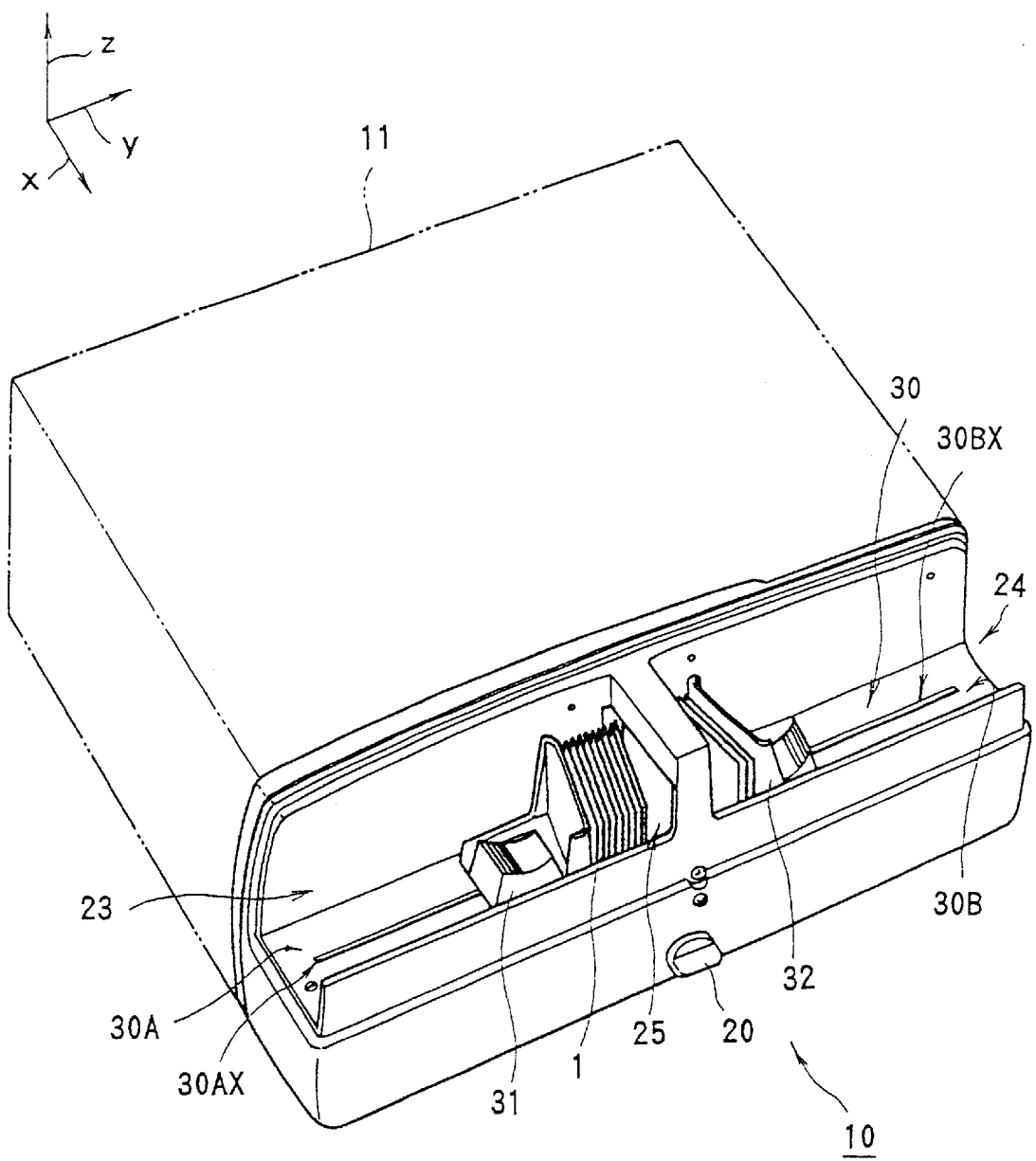
FIG. 3 is a perspective view showing an overall configuration of a slide feeder according to a present embodiment.
Figure 4:
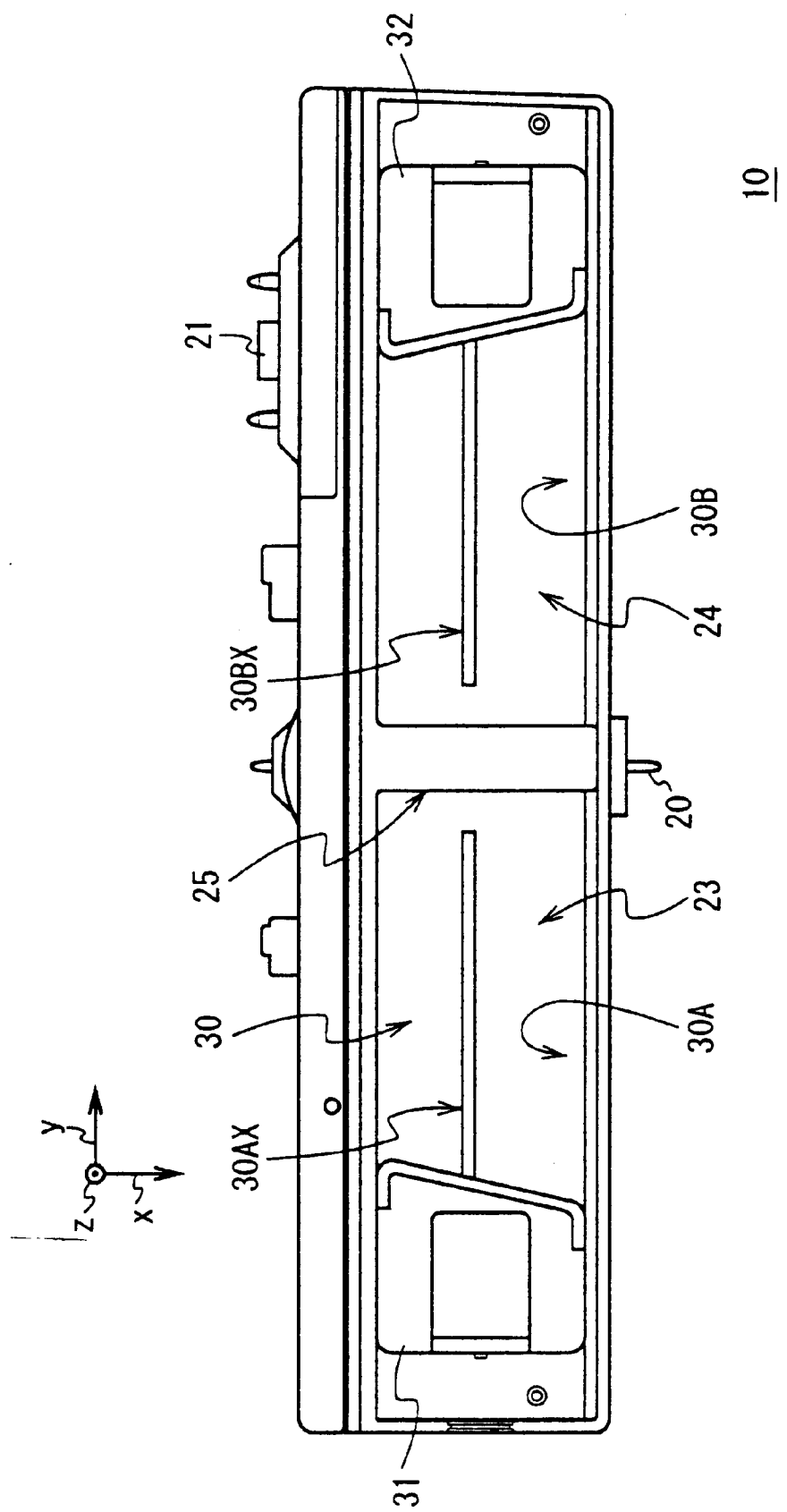
FIG. 4 is a top view showing a configuration of the slide feeder according to the present embodiment.
Figure 5:
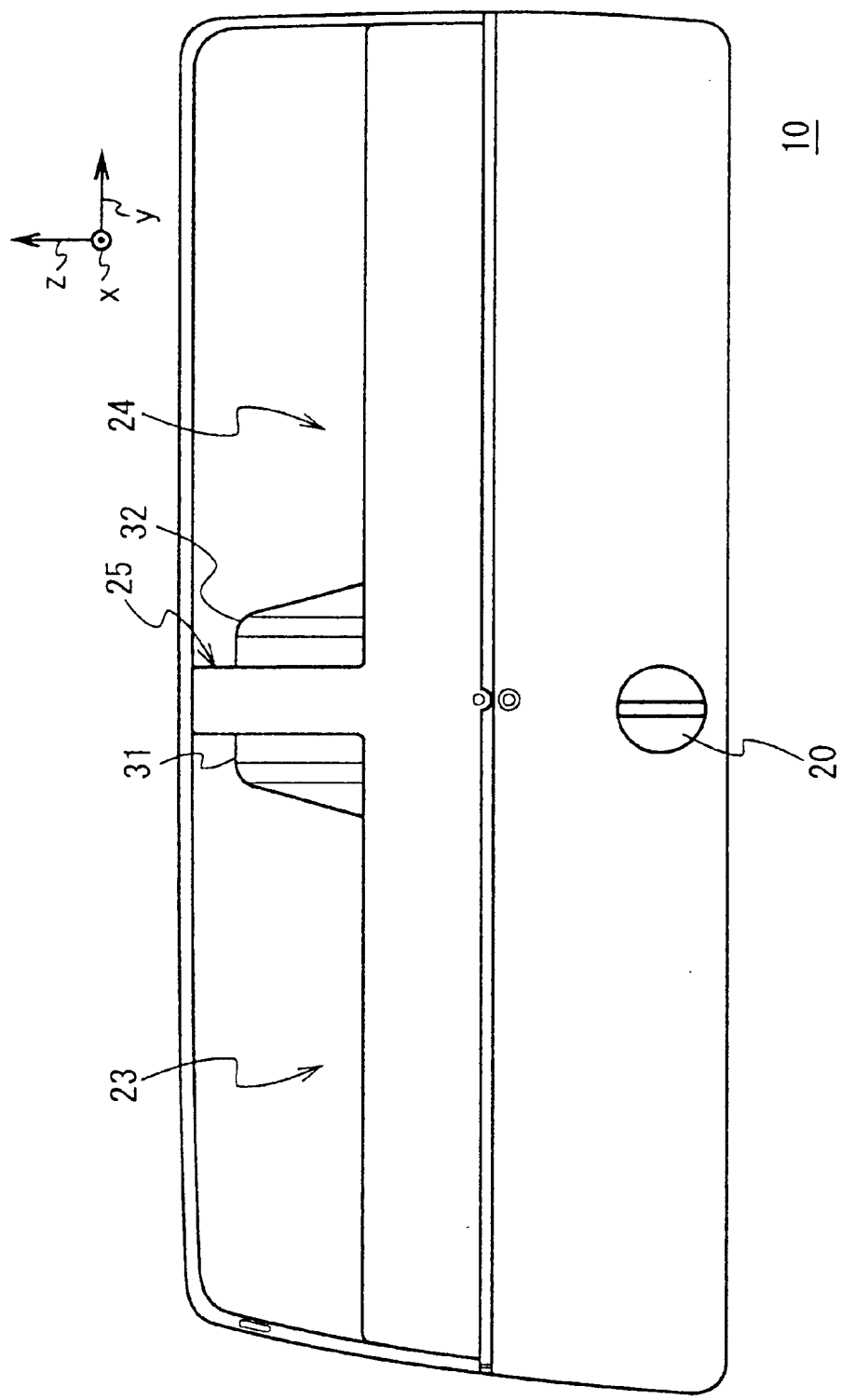
FIG. 5 is a front view showing the configuration of the slide feeder according to the present embodiment.
Figure 6:
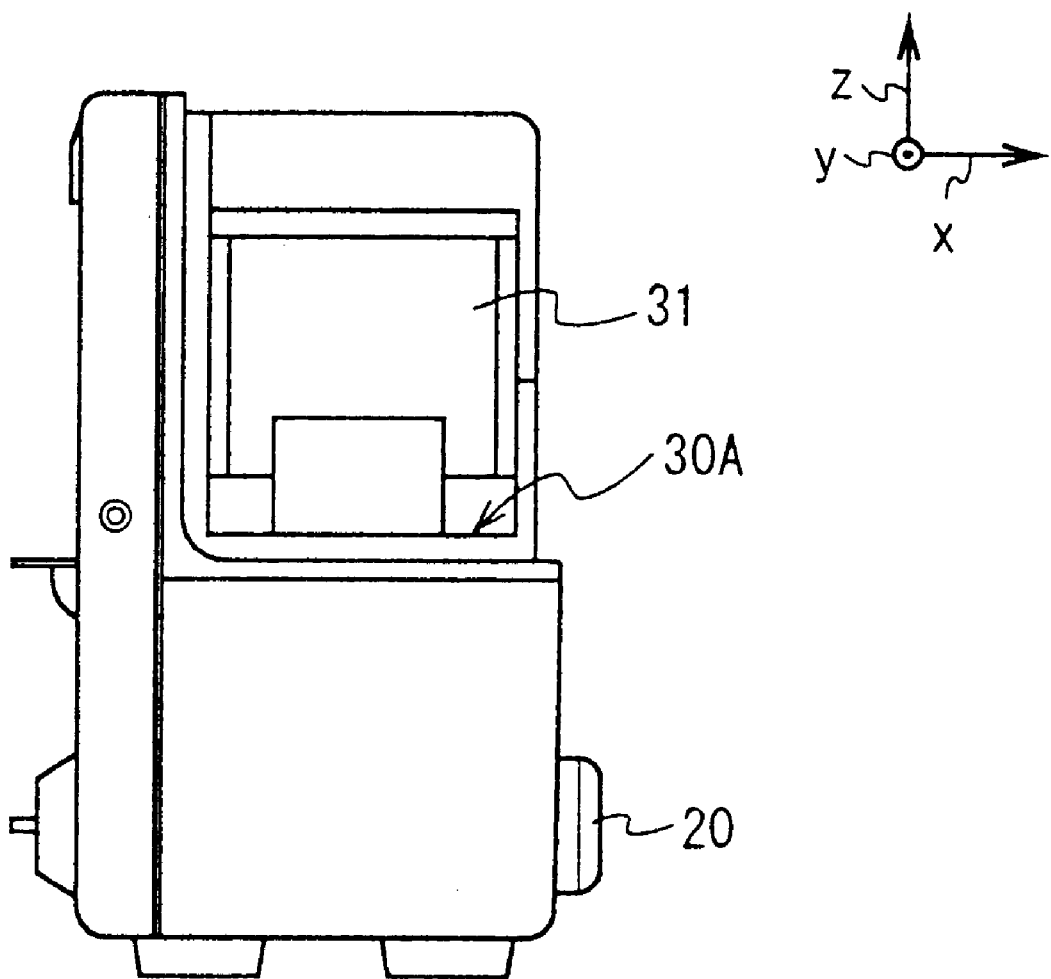
FIG. 6 is a side view showing the configuration of the slide feeder according to the present embodiment.

On the other hand, first and second slide stock sections 23 and 24 are formed on a front surface of the slide feeder 10, and a slide carrying mechanism section 25 is formed between the first and second slide stock sections 23 and 24 as apparent from FIGS. 3 and 4.

In this case, the first and second slide stock sections 23 and 24 are formed symmetrically with regard to the slide carrying mechanism section 25, and the slide carrying mechanism section 25 is formed symmetrically with regard to a center between the first and second slide stock sections 23 and 24.

The first slide stock section 23 is actually configured by half a side (hereinafter referred to as a first groove half 30A) of a groove portion 30 which is formed on a side of a front surface of the slide feeder 10 in parallel with the direction indicated by the arrow y and nearly as deep as a lateral width of the slide 1, and a first slide clamp 31 which is disposed on the first groove half 30A.

A portion (not shown) which protrudes from a bottom surface of the first slide clamp 31 is fitted into a slit 30AX bored in a bottom surface of the first groove half 30A in parallel with the direction indicated by the arrow y, whereby the first slide clamp 31 is slidable on the first groove half 30A along the above described slit 30AX. Furthermore, the first slide clamp 31 is urged in the direction indicated by the arrow y with a first compression coil spring (not shown) which is disposed in the slide feeder 10.

Accordingly, the first slide stock section 23 is configured so as to be capable of stocking a plurality of slides 1 in the first groove half 30A while consecutively overlapping in the direction indicated by the arrow y, for example, as shown in FIG. 3 and urging the slides 1 stocked as described above with the first slide clamp 31 so that the slides 1 are pressed to a first plate 44 (FIG. 8A) of a slide carrying mechanism section 25 described later.

Similarly, the second slide stock section 24 is configured by the other half of the groove portion 30 (hereinafter referred to as a second groove half 30B) and a second slide clamp 32 which is disposed on the above described second groove half 30B and has a shape of a reflected image of the first slide clamp 32.

In this case, a portion protruding from a bottom surface of the second slide clamp 32 is fitted into a slit 30BX bored in a bottom surface of the second groove half 31B in parallel with the direction indicated by the arrow y, whereby the second slide clamp 32 can slide on the second groove half 30B along the above described slit 30BX. Furthermore, the second slide clamp 32 is urged in a direction reverse to the direction indicated by the arrow y with a second compression coil spring (not shown) disposed in the slide feeder 10.

Thereby, the second slide stock section 24 is configured to be capable of stocking a plurality of slides 1 in the second groove half 31B while overlapping consecutively in the direction indicated by the arrow y and urging the slides 1 stocked as described above with the second slide clamp 31B so that the slides 1 are pressed to a second plate 45 (FIG. 8A) of the slide carrying mechanism section 25 described later.

Figure 8A:
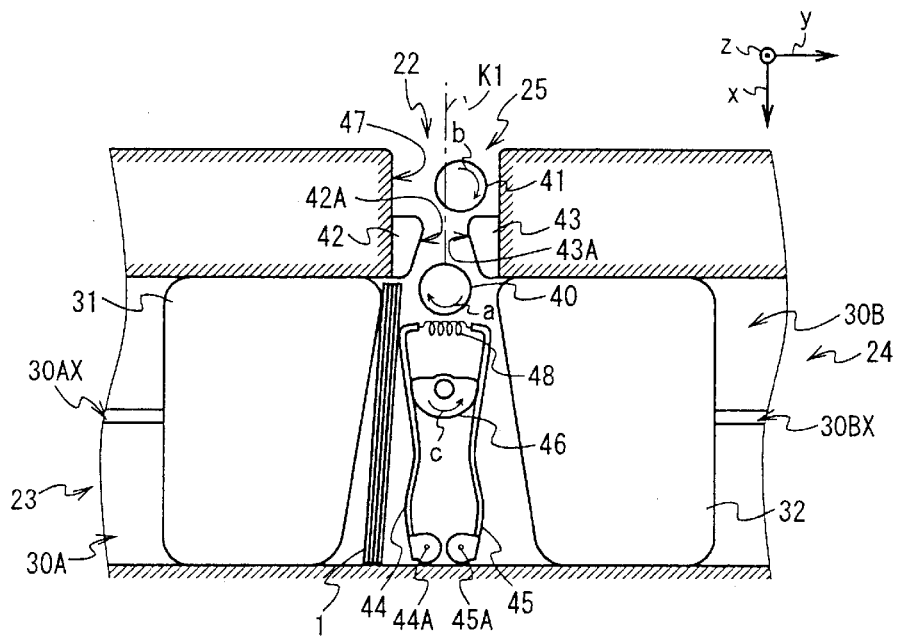
FIGS. 8A and 8B are schematic top views descriptive of a configuration and operations of a slide carrying mechanism section.

The slide carrying mechanism section 25 has a main roller 40 and a sub-roller 41 which are made of rubber materials respectively, first and second separating pads 42 and 43 which are made of a synthetic resin, the first and second plates 44 and 45 which are disposed rotatably around fulcrum shafts 44A and 45A respectively at a front end, and a cam 46 which is disposed between the first and second plates 44 and 45, for example, as shown in FIG. 8A.

In this case, the main roller 40 is disposed so that a center axis of the main roller 40 is located on an extension line of a centerline K1 of an opening 47 in the width direction which communicates the groove portion 30 with the slide supply/discharge port 22 in the slide feeder 10 (corresponding to a center between the first and second slide stock sections 23 and 24) and configured to be freely rotatable in a direction indicated by an arrow a or a reverse direction on the basis of a driving force given from a roller driving system (not shown).

Figure 10A:
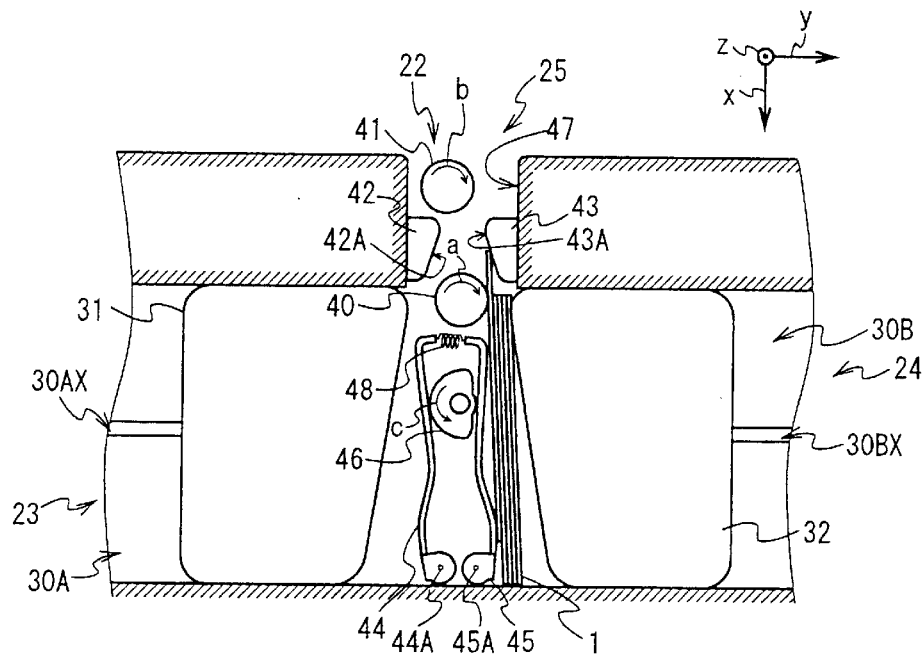
FIGS. 10A and 10B are schematic top views descriptive of the configuration and the operations of the slide carrying mechanism section.
Figure 10B:
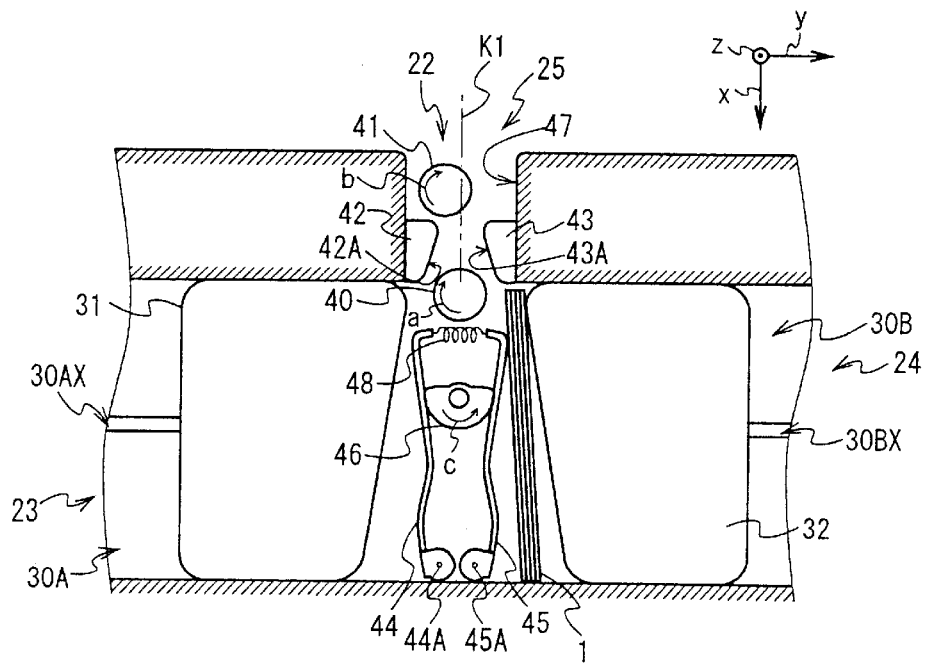

Furthermore, the sub-roller 41 is configured to be rotated always in a direction identical to a rotating direction of the main roller 40 on the basis of a driving force given from the above described roller driving system and freely set at a first position slightly deviated leftward from the centerline K1 of the opening 47 by a sub-roller driving system (not shown) as shown in FIG. 8A or a second position slightly deviated rightward from the centerline K1 of the opening 47 as shown in FIG. 10B.

Furthermore, the first and second separating pads 42 and 43 are fixedly disposed in the vicinities of an open end on a side of a groove portion 30 of the opening 47 in a positional relationship symmetrical with regard to the centerline K1 of the above described opening 47, and taper surfaces 42A and 43A are formed on tips of the separating pads so that the pads are nearer the centerline K1 of the opening 47 as the pads are nearer the slide supply/discharge port 22 from the groove portion 30.

In the case of this embodiment, linear concavities and convexities are formed on the taper surfaces 42A and 43A of the first and second separating pads 42 and 43 in parallel with a direction indicated by an arrow z so that the slides 1 can be separated more securely as described later.

On the other hand, the first and second plates 44 and 45 are disposed in a positional relationship symmetrical with regard to an extension line of the centerline K1 of the opening 47 and rear ends of these plates are integrally coupled with a compression coil spring 48.

Furthermore, the cam 46 is disposed so that a center axis of the cam 46 is located on the extension line of the centerline K1 of the opening 47 and configured to be freely rotatable on the basis of a driving force given from a cam driving system (not shown) in a direction indicated by an arrow c or a reverse direction.

Next, description will be made of operations of the slide feeder 10 with reference to FIGS. 8A to 10B.

First of all, description will be made of operations in a first operation mode for feeding the slide 1 stocked in the first slide stock section 23 to the slide scanner 11 (FIG. 3). At an initial time, the cam 46 of the slide carrying mechanism section 25 is located at a rotating position where the rear ends of the first and second plates 44 and 45 are pushed open maximum as shown in FIG. 8A (this rotating position will hereinafter be referred to as a home position). At this time, the main roller 40 and the sub-roller 41 are rotated in a direction indicated by an arrow a and a direction indicated by an arrow b respectively on the basis of rotating forces given from a roller driving system, and the sub-roller 41 is located at a first position.

In this condition, the slide 1 which is stocked in the first slide stock section 23 is supported by the first plate 44 at a position apart from the main roller 40, whereby a rotation of the main roller 40 produces no influence on the slide 1 which is stocked in the first slide stock section 23.

Figure 8B:
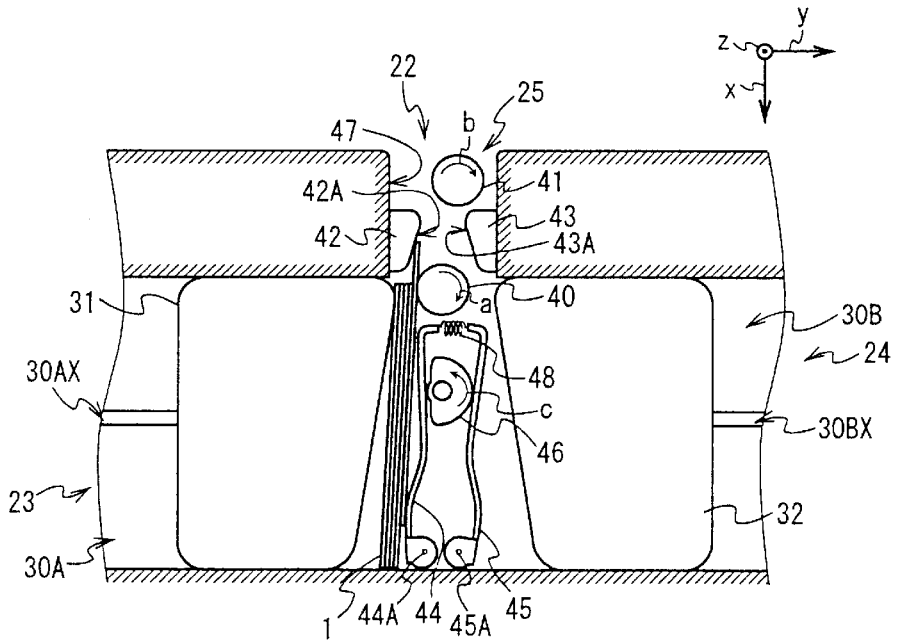

In this condition, a cam driving system drives the cam 46 until the cam 46 rotates 90° in the direction indicated by the arrow c as shown in FIG. 8B. As the cam 46 rotates as described above, only the first plate 44 is rotated by an elastic force of the compression coil spring 48 at a small angle around the fulcrum 44A in a direction to come nearer the second plate 45.

As a result, a leading slide 1 out of the slides 1 stocked in the first slide 1 stock section 23 is pressed to the main roller 40 by an urging force given from the first slide clamp 31, and friction between the main roller 40 and the slide 1 allows a rotating force of the main roller 40 to be transmitted to the slide 1 as a thrust, whereby the above described slide 1 is carried toward the supply/discharge port 22.

Even when two or more slides 1 are carried as the main roller 40 rotates at this stage due to a frictional force between the slides 1 which are overlapped with one another, leading ends of these slides 1 in the feeding direction of the slides 1 strike against the taper surface 42A of the first separating pad 2, and second and later slides 1 are separated by the first separating pad 42, whereby only a first slide 1 which is kept in contact with the main roller 40 is fed into the slide supply/discharge port 22.

Figure 9A:
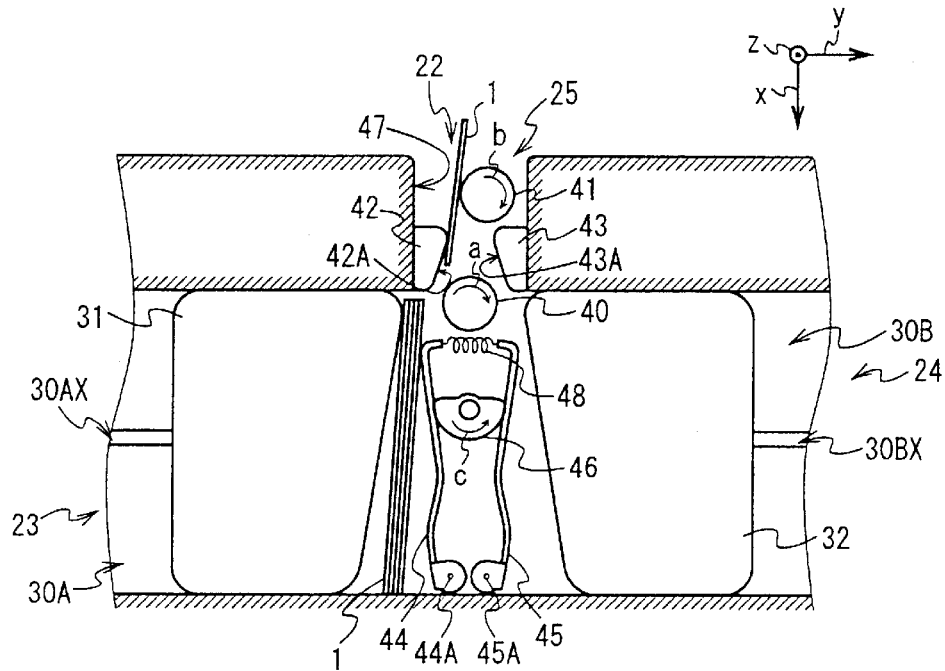
FIGS. 9A and 9B are schematic top views descriptive of the configuration and the operations of the slide carrying mechanism section.

When the slide 1 is fed into the slide scanner 11 as described above, the cam driving system drives the cam 46 so as to rotate 90° in the direction reverse to the direction indicated by the arrow c until the cam 47 returns again to the home position as shown in FIG. 9A, whereby the slides 1 stocked in the first slide stock section 23 are supported by the first plate 44 of the slide carrying mechanism section 25 at locations apart from the main roller 40.

Figure 9B:
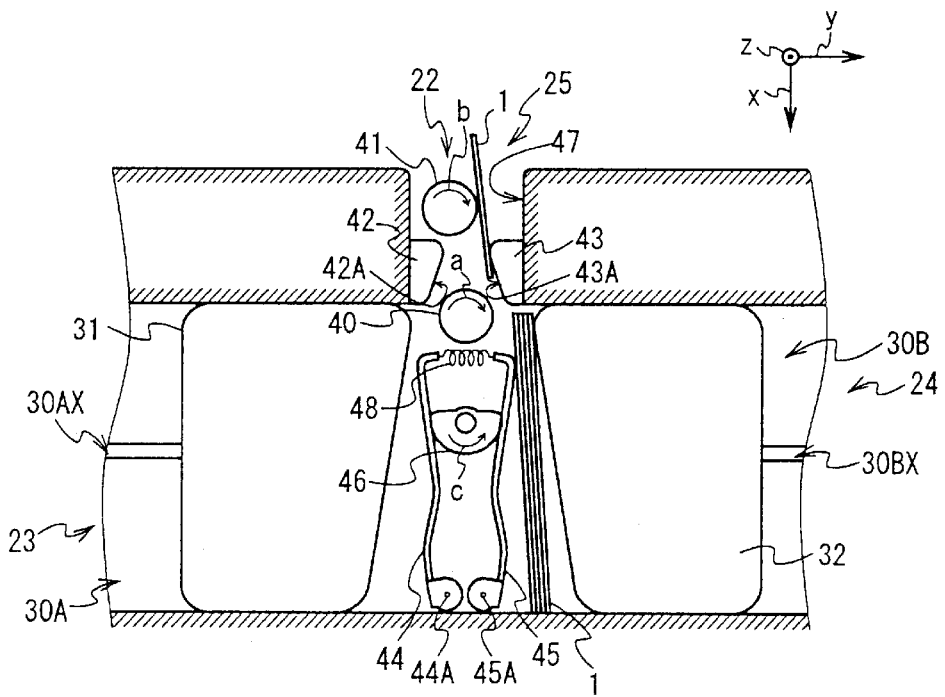

Furthermore, when the slide 1 which is fed into the slide scanner 11 as described above is discharged from the slide scanner 11 after completing a treatment, a sub-roller driving system drives the sub-roller 41 so as to move to a second position as shown in FIG. 9B. As a result, the slide 1 which is discharged from the slide scanner 11 is taken into the slide feeder 10 toward the second slide stock section 24 as the above described sub-roller 41 rotates due to friction between the slide 1 and the sub-roller 41.

Simultaneously, the cam driving system drives the cam 46 to rotate it 90° from the home position in the direction reverse to the direction indicated by the arrow c as shown in FIG. 10A, whereby the second plate 45 is rotated by the elastic force of the compression coil spring 48 at a small angle around the fulcrum 45A in a direction to come nearer the first plate 44. As a result, the slide 1 which is taken into the slide feeder 10 is fed into the second slide stock section 24 without being hindered by the second plate 45 as the above described main roller 40 rotates due to friction between the slide 1 and the main roller 40.

When the slide 1 is fed completely into the second slide stock section 24 subsequently, the cam driving system drives the cam 46 to return it to the home position, whereby the first and second plates 44 and 45 are returned to open conditions as shown in FIG. 10B, whereby the slide 1 is stocked into the second slide stock section 24.

And, the slide feeder 10 repeats such a series of operations for each slide 1. The slide feeder 10 is configured to be capable of successively feeding the slides 1 stocked in the first slide stock section 23 consecutively into the slide scanner 11 and stocking the slides 1 discharged from the slide scanner 11 after the treatment consecutively into the second slide stock section 24 in the first operation mode as described above.

Next, description will be made of operations in a second operation mode for feeding the slides 1 stocked in the second slide stock section 24 into the slide scanner 11. In this case, the cam 46 is located at a home position shown in FIG. 10A at an initial time. At this time, the main roller 40 and the sub-roller 41 are rotated in a direction reverse to a direction indicated by an arrow a on the basis of a driving force given from the roller driving system, and the sub-roller 41 is located at a second home position.

In this condition, the slides 1 which are stocked in the second slide stock section 24 are supported by the second plate 45 at a location apart from the main roller 40 and a rotation of the main roller 40 produces no influence on the slides 1 stocked in the second slide stock section 24.

In this condition, the cam driving system drives the cam 46 until it is rotated 90° in the direction reverse to the direction indicated by the arrow c as shown in FIG. 10B. As the cam 46 is rotated as described above, the second plate 45 is rotated by the elastic force of the compression coil spring 48 at a small angle around the fulcrum 45A in the direction to come nearer the first plate 44.

As a result, a leading slide 1 out of the slides 1 stocked in the second slide stock section 24 is pressed to the main roller 40 by an urging force given from the second slide clamp 32 and friction between the slide 1 and the main roller 40 allows a rotating force of the main roller 40 to be transmitted to the slide 1 as a thrust, whereby the above described slide 1 is carried toward the slide supply/discharge port 22.

Even when two or more slides 1 are carried as the main roller 40 rotates at this stage due to friction among the slide 1 which are overlapped with one another, leading ends of the slides 1 in the feeding direction strike against the taper surface 43A of the second separating pad 43 and second and later slides 1 are separated by the second separating pad 43, whereby only a first slide 1 which is kept in contact with the main roller 40 is fed into the slide supply/discharge port 22.

When the slide 1 is fed into the slide scanner 11 as described above, the cam 46 is rotated 90° by the cam driving system in the direction indicated by the arrow c and returned again to the home position as shown in FIG. 9B, whereby the slides 1 stocked in the second slide stock section 24 are supported by the second plate 45 at a location apart from the main roller 40.

When the slide 1 which is fed into the slide scanner 11 is discharged from the above described slide scanner 11 subsequently after completing the treatment, the sub-roller 41 is moved by the sub-roller driving system to the first position as shown in FIG. 9A. As a result, the slide 1 which is discharged from the slide scanner 11 is taken into the slide feeder 10 toward the first slide stock section 23 as the above described sub-roller 41 rotates due to friction between the slide 1 and the sub-roller 41.

Simultaneously, the cam driving system drives the cam 46 to rotate it 90° in the direction indicated by the arrow c from the home position as shown in FIG. 8B, whereby the first plate 44 is rotated by the elastic force of the compression coil spring 48 at a small angle around the fulcrum 44A in a direction to come nearer the second plate 45. As a result, the slide 1 which is fed into the slide feeder 10 is fed into the first slide stock section 23 without being hindered by the first plate 44 as the above described main roller 40 rotates due to friction between the slide 1 and the main roller 40.

When the slide 1 is fed completely into the first slide stock section 23 subsequently, the cam driving system drives the cam 46 to return it to the home position, and the first and second plates 44 and 45 are returned to the open conditions as shown in FIG. 8A, whereby the slide 1 is stocked into the first slide stock section 23.

The slide feeder 10 repeats such a series of operations for each slide 1. The slide feeder 10 is configured to be capable of successively feeding the slides 1 stocked in the second slide stock section 24 consecutively into the slide scanner 11 and stocking the slides 1 discharged from the slide scanner 11 after the treatment consecutively into the first slide stock section 23 in the second operation mode as described above.

In the first operation mode, the slide feeder 10 which has the above described configuration feeds the slides 1 stocked in the first slide stock section 23 into the slide scanner 11 with the slide carrying mechanism section 25 and stocks the slides 1 discharged from the slide scanner 11 into the second slide stock section 24 with the slide carrying mechanism 25, whereas in the second operation mode, the slide feeder 10 feeds the slides 1 stocked in the second slide stock section 24 into the slide scanner 11 with the slide carrying mechanism section 25 and stocks the slides 1 discharged from the slide scanner 11 into the first slide stock section 23 with the slide carrying mechanism section 25.

Even when preliminary scanning and regular scanning of the slides 1 are carried out successively, the slide feeder 10 is capable of repeatedly scanning the same slides simply by switching the operation modes without requiring a work for exchanging stock locations for the slides 1 by manually returning the slides 1 stocked in the second slide stock section 24 to the first slide stock section 23.

Furthermore, the slide feeder 10 is capable of feeding a next slide 1 immediately after feeding a slide 1 with no preparation time since the slide feeder 10 is configured to strike the slides 1 stocked in the first or second slide stock section 23 or 24 against the rotating main roller 40 of the slide carrying mechanism section 25 so that the above described slide 1 is carried by the rotating force of the above described main roller 40.

Furthermore, the slide feeder 10 is capable of separating the slides 1 more securely than a slide feeder which uses a metal leaf spring since the slide feeder 10 is configured to separate the slides 1 with the first and second separating pads 42 and 43 made of the synthetic resin in the slide carrying mechanism section 25 at the feeding time.

The above described configuration makes it possible, in the first operation mode, to feed the slides 1 stocked in the first slide stock section 23 into the slide scanner 11 with the slide carrying mechanism section 25 and stock the slides 1 discharged from the above described slide scanner 11 into the second slide stock section 24 with the slide carrying mechanism section 25, and in the second operation mode, feed the slides 1 stocked in the second slide stock section 24 into the slide scanner 11 with the slide carrying mechanism section 25 and stock the slides 1 discharged from the slide scanner 11 into the first slide stock section 23 with the slide carrying mechanism section 25, thereby making it possible to realize a slide feeder which is capable of scanning the same slides 1 repeatedly without requiring a work for exchanging stock locations for the slides 1 and remarkably enhancing convenience in use.

Furthermore, the present invention is configured to use, as means for carrying the slides 1, the main roller 40 and the sub-roller 41 which are made of a rubber material, and carry the slides 1 with a rotating force of the above described main roller 40 while pressing the slides 1 against the main roller 40, thereby making it possible to realize a high performance slide feeder which is capable of feeding a next slide 1 immediately after feeding the slide 1 with no preparation time and coping with a high-speed scanning work.

Furthermore, the present invention is configured to separate the slides 1 with the first and second separating pads 42 and 43 made of the synthetic resin at the feeding time, thereby making it possible to separate the slides 1 more securely than a slide feeder which uses a metal leaf spring. Accordingly, the present invention makes it possible to realize a slide feeder which is capable of stably feeding the slides 1 one by one and exhibits high performance of slide feeding.

Though the present invention is applied to the slide feeder which feeds the slides 1 into the slide scanner 11 in the above described embodiment, the present invention is not limited by the embodiment and the present invention is widely applicable, for example, also to a slide feeder which feeds slides to a slide projector and slide feeders which feed slides to other appliances.

Though the slide carrying mechanism section 25 is configured as shown in FIGS. 8 to 10 in the above described embodiment, the present invention is not limited by the embodiment and other various kinds of configurations are applicable to the slide carrying mechanism section 25.

Though the linear concavities and convexities are formed on the taper surfaces 42A and 43A of the first and second separating pads 42 and 43 in the direction in parallel with the direction indicated by the arrow z in the above described embodiment, the present invention is not limited by the embodiment, and convexities and concavities having other various shapes are widely applicable as the concavities and convexities on the taper surfaces 42A and 43A of the first and second separating pads 42 and 43.

Though the main roller 40 and the sub-roller 41 are made of the rubber material in the above described embodiment, the present invention is not limited by the embodiment, and other various kinds of materials are applicable as materials of the main roller 40 and the sub-roller 41 so far as the materials can produce between the slide 1 and the rollers 40 and 41 frictional forces which can transmit rotating forces of the main roller 40 and the sub-roller 41 as a thrust of the slides 1.

Though the first and second separating pads 42 and 43 are made of the synthetic resin in the above described embodiment, the present invention is not limited by the embodiment, and other various kinds of materials such as metal and rubber are widely applicable as materials of the first and second separating pads 42 and 43 so far as the material has rigidity.

The present invention configures a slide feeder so as to comprise a slide carrying mechanism section between a first and second slide stock sections which feeds slide mounts stocked in the first slide stock section into an external appliance and takes and carries the slide mounts discharged from the external appliance so as to be stocked into the second slide stock section in a first operation mode, and feeds the slide mounts stocked in the second slide stock section into the external appliance and carries the slide mounts discharged from the external appliance so as to be stocked into the first slide stock section in a second operation mode, thereby making it possible to realize a slide feeder which is capable of feeding the same slide mounts repeatedly into an external appliance with no use of a human hand and remarkably enhancing convenience in use.

Furthermore, the present invention configures a slide feeder so as to comprise a rotatable roller and roller driving means for rotatingly driving the above described roller in a slide carrying mechanism section for carrying slide mounts, and press the slide mounts stocked in a first slide stock section against the roller so that the above described slide mounts are carried by a rotating force of the above described roller in a feeding direction, thereby making it possible to realize a slide feeder which is capable of sufficiently coping with a high-speed treatment of slide mounts with an external appliance in practical use and exhibiting enhanced performance.

Furthermore, the present invention configures a slide feeder so as to comprise separating pads having taper surfaces in a slide carrying mechanism section for carrying slide mounts and strike leading ends of the slide mounts in a feeding direction against the taper surfaces of the separating pads to separate the slide mounts at a feeding time, thereby making it possible to realize a slide feeder which is capable of separating slide mounts more securely at a feeding time and exhibiting enhanced performance.

Furthermore, the present invention configures a slide system that is composed between the slide feeder for carrying slide mounts and an external appliance to which the slide mounts are fed.

As a result, it is possible to feed the same slide mounts repeatedly into the external appliance simply by switching the operation modes with no help by a human hand. Thus, it is possible to provide a slide system that can significantly enhance the convenience in use.

Furthermore, the present invention configures a slide feeding method comprises: in a first operation mode, feeding slide mounts stocked in the first slide stock section which is disposed in a slide feeder from the slide feeder to the external appliance, and taking and carrying the slide mounts discharged from the external appliance so as to stock the slide mounts into the second slide stock section disposed in the slide feeder; and in a second operation mode, feeding the slide mounts stocked in the second slide stock section to the external appliance, taking the slide mounts discharged from the external appliance and carrying the slide mounts so as to stock into the first slide stock section.

In this way, this slide feeding method is capable of feeding the same slide mounts repeatedly into the external appliance simply by switching the operation modes with no help by a human hand, thereby being possible to provide a slide feeding method that can significantly enhance the convenience in use.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A slide feeder comprising:
   first and second slide stock sections for stocking slide mounts to be fed to an external appliance and for taking and stocking said slide mounts discharged from said external appliance; and
   a slide carrying mechanism section which is disposed between said first and second slide stock sections, wherein said slide carrying mechanism section includes,
   a rotatably disposed main roller and a main roller driving means for rotatingly driving said main roller,
   a slide clamp for pressing said slide mounts stocked in said first slide stock section or said second slide stock section to said main roller, thereby carrying said slide mounts with a rotating force of said main roller in a direction of a feeding,
   and a rotably disposed sub-roller and sub-roller driving means for rotatingly driving said sub-roller, wherein said sub-roller is configured to strike said slide mounts on a same side upon which said main roller strikes said slide mounts, and wherein said main and sub-rollers are configured to rotate in a same circular direction at a time of said feeding and at a time of striking.

2. The slide feeder according to claim 1 wherein said first and second slide stock sections are arranged symmetrically with regard to said slide carrying mechanism section, and said slide carrying mechanism section is configured symmetrically with regard to a center between said first and second slide stock sections.

3. The slide feeder according to claim 1 wherein in a first operation mode, said slide carrying mechanism section feeds said slide mounts stocked in said first slide stock section to said external appliance, and takes and carries said slide mounts discharged from said external appliance so as to stock said slide mounts into said second slide stock section.

4. The slide feeder according to claim 1 wherein in a second operation mode, said slide carrying mechanism section feeds said slide mounts stocked in said second slide stock section to said external appliance and carries said slide mounts discharged from said external appliance so as to stock said slide mounts into said first slide stock section.

5. The slide feeder according to claim 1, wherein said slide carrying mechanism section further includes a separating pad having a taper surface, wherein said main roller is configured to strike leading ends of said slide mounts in the direction of said feeding against said taper surface of said separating pad, thereby separating said slide mounts at a time of said feeding.

6. The slide feeder according to claim 1 wherein said external appliance is a slide imaging device which optically captures said slide mounts.

7. The slide feeder according to claim 1 wherein said external appliance is a slide projector which projects said slide mounts.

8. A slide system comprising:
an external appliance to which slide mounts are fed; and
a slide feeder for carrying said slide mounts to said external appliance,
wherein said slide feeder includes,
first and second slide stock sections for stocking slide mounts to be fed to said external appliance and taking and stocking said slide mounts discharged from said appliance; and
a slide carrying mechanism section which is disposed between said first and second slide stock sections, wherein said slide carrying mechanism section includes,
a rotatably disposed main roller and a main roller driving means for rotatingly driving said main roller,
a slide clamp for pressing said slide mounts stocked in said first slide stock section or said second slide stock section to said main roller, thereby carrying said slide mounts with a rotating force of said main roller in a direction of a feeding,
and a rotably disposed sub-roller and sub-roller driving means for rotatingly driving said sub-roller, wherein said sub-roller is configured to strike said slide mounts on a same side upon which said main roller strikes said slide mounts, and wherein said main and sub-rollers are configured to rotate in a same circular direction at a time of said feeding and at a time of striking.

9. The slide system according to claim 8 wherein said first and second slide stock sections are arranged symmetrically with regard to said slide carrying mechanism section, and said slide carrying mechanism section is configured symmetrically with regard to a center between said first and second slide stock sections.

10. The slide system according to claim 8 wherein in a first operation mode, said slide carrying mechanism section feeds said slide mounts stocked in said first slide stock section to said external appliance, and takes and carries said slide mounts discharged from said external appliance so as to stock said slide mounts into said second slide stock section.

11. The slide system according to claim 8 wherein in a second operation mode, said slide carrying mechanism section feeds said slide mounts stocked in said second slide stock section to said external appliance and carries said slide mounts discharged from said external appliance so as to stock said slide mounts into said first slide stock section.

12. The slide system according to claim 8, wherein said slide carrying mechanism section further includes a separating pad having a taper surface, wherein said main roller is configured to strike leading ends of said slide mounts in the direction of said feeding against said taper surface of said separating pad, thereby separating said slide mounts at a time of said feeding.

13. The slide system according to claim 8 wherein said external appliance is a slide imaging device which optically captures said slide mounts.

14. The slide system according to claim 8 wherein said external appliance is a slide projector which projects said slide mounts.

15. A slide feeding method comprising the steps of:
in a first operation mode, feeding slide mounts stocked in a first slide stock section which is disposed in a slide feeder from said slide feeder to an external appliance, and taking and carrying said slide mounts discharged from said external appliance so as to stock said slide mounts into a second slide stock section disposed in said slide feeder, wherein a slide carrying mechanism section disposed in said slide feeder is controlled to carry said slide mounts stocked in said first slide stock section or said second slide stock section, and wherein said slide carrying mechanism includes,
a rotatably disposed main roller and a main roller driving means for rotatingly driving said main roller,
a slide clamp for pressing said slide mounts stocked in said first slide stock section or said second slide stock section to said main roller, thereby carrying said slide mounts with a rotating force of said main roller in a direction of a feeding,
and a rotably disposed sub-roller and sub-roller driving means for rotatingly driving said sub-roller, wherein said sub-roller is configured to strike said slide mounts on a same side upon which said main roller strikes said slide mounts, and wherein said main and sub-rollers are configured to rotate in a same circular direction at a time of said feeding and at a time of striking;
and in a second operation mode, feeding said slide mounts stocked in said second slide stock section to said external appliance, taking said slide mounts discharged from said external appliance and carrying said slide mounts so as to stock into said first slide stock section.

16. The slide feeding method according to claim 15 wherein said external appliance is a slide imaging device which optically captures said slide mounts.

17. The slide feeding method according to claim 15 wherein said external appliance is a slide projector which projects said slide mounts.

* * * * *